United States Patent
Daino et al.

(10) Patent No.: US 8,240,786 B2
(45) Date of Patent: Aug. 14, 2012

(54) DOOR LATCH

(75) Inventors: Franco Fabio Daino, Muskego, WI (US); Gregory Jon Holcomb, Cedar Falls, IA (US); Steven Frederick Kohagen, Waverly, IA (US); Matthew J. Sallee, Hudson, IA (US); Bradley M. White, Cedar Falls, IA (US)

(73) Assignee: Waterloo Industries, Inc., Oak Creek, WI (US)

( * ) Notice: Subject to any disclaimer, the term of this patent is extended or adjusted under 35 U.S.C. 154(b) by 863 days.

(21) Appl. No.: 12/270,316

(22) Filed: Nov. 13, 2008

(65) Prior Publication Data

US 2009/0127987 A1    May 21, 2009

Related U.S. Application Data

(60) Provisional application No. 60/988,627, filed on Nov. 16, 2007.

(51) Int. Cl.
*A47B 96/00* (2006.01)

(52) U.S. Cl. .............. 312/324; 312/332.1; 292/128

(58) Field of Classification Search .......... 312/330.1, 312/332.1, 109, 326, 327, 328, 329, 324, 312/351, 216; 292/86, 95, 128; 70/91, 101, 70/106, 207, 209
See application file for complete search history.

(56) References Cited

U.S. PATENT DOCUMENTS

| | | | |
|---|---|---|---|
| 1,607,099 A * | 11/1926 | O'Connor ................ | 312/324 |
| 2,197,195 A | 4/1940 | Schemers | |
| 2,489,154 A * | 11/1949 | Relton .................... | 292/251.5 |
| 2,667,058 A | 1/1954 | Skoglund | |
| 2,710,212 A | 6/1955 | Larimore | |
| 2,944,864 A | 7/1960 | Krivulka | |
| 3,003,800 A | 10/1961 | Hammond | |
| 3,120,412 A | 2/1964 | Caldwell | |
| 3,208,781 A | 9/1965 | Appleberry | |
| 3,288,508 A | 11/1966 | Maize et al. | |

(Continued)

FOREIGN PATENT DOCUMENTS

GB    2309045    7/1997

(Continued)

OTHER PUBLICATIONS

European Search Report from European Patent Application No. 08850162.2, dated Apr. 1, 2011.

(Continued)

*Primary Examiner* — James O Hansen (74) *Attorney, Agent, or Firm* — Calfee, Halter & Griswold LLP (57) ABSTRACT

A cabinet includes a frame portion and a door hingedly connected to the frame portion. A member is rigidly connected to the door and includes a flange portion extending from and spaced apart from an outer surface of the door. A handle is pivotably connected to the door and includes a user graspable portion disposed between the first outer surface of the door and the flange portion of the member. A catch member is rigidly connected to the user graspable portion and extends through a slot in the door for interlocking engagement with a retention feature disposed on the frame portion. When the door is in a closed position, handle is pivotable with respect to the door from a door retention position to a door release position for disengagement of the catch member from the door retention feature.

16 Claims, 6 Drawing Sheets

U.S. PATENT DOCUMENTS

| | | | |
|---|---|---|---|
| 4,681,381 A | | 7/1987 | Sevey |
| 4,703,981 A | * | 11/1987 | Stewart .................. 312/258 |
| 5,054,864 A | * | 10/1991 | Cesena ................... 312/328 |
| 5,261,712 A | | 11/1993 | Walter |
| 5,292,191 A | | 3/1994 | Slivon |
| 5,388,902 A | | 2/1995 | Huebschen et al. |
| 5,399,010 A | * | 3/1995 | McClung et al. .......... 312/334.1 |
| 5,403,139 A | | 4/1995 | Silvon et al. |
| 5,435,640 A | | 7/1995 | Holcomb |
| 5,630,630 A | | 5/1997 | Price et al. |
| 5,720,535 A | | 2/1998 | Mehman |
| 5,775,140 A | | 7/1998 | Hallsten |
| 5,785,398 A | | 7/1998 | Park |
| 5,868,478 A | | 2/1999 | Yemini |
| 5,975,593 A | * | 11/1999 | Cress .................. 292/86 |
| 6,375,235 B1 | | 4/2002 | Mehmen |
| 6,412,317 B1 | * | 7/2002 | Martin ................. 70/81 |
| 6,527,353 B1 | | 3/2003 | Bradfish et al. |
| 6,547,289 B1 | | 4/2003 | Greenheck et al. |
| 6,601,884 B2 | | 8/2003 | Bastian |
| 6,851,286 B2 | | 2/2005 | Dubé et al. |
| 6,997,527 B2 | | 2/2006 | Cheng |
| 7,048,347 B1 | | 5/2006 | Liu |
| 7,121,638 B1 | | 10/2006 | Eggert et al. |
| 7,318,632 B2 | * | 1/2008 | Bidinger et al. .......... 312/319.9 |
| RE40,267 E | | 4/2008 | Mehmen |
| D580,195 S | | 11/2008 | Daino et al. |
| 2006/0101874 A1 | * | 5/2006 | Mikolajczyk et al. ........... 70/84 |
| 2006/0103278 A1 | | 5/2006 | Bousquet |
| 2008/0150407 A1 | | 6/2008 | Mehmen |

FOREIGN PATENT DOCUMENTS

| | | |
|---|---|---|
| JP | 52025198 | 2/1977 |
| JP | 5847879 | 3/1983 |
| TW | 471519 | 1/2002 |
| TW | 530731 | 5/2003 |
| TW | 532264 | 5/2003 |
| TW | 533798 | 5/2003 |
| TW | 554707 | 9/2003 |
| TW | M248578 | 11/2004 |

OTHER PUBLICATIONS

International Search Report and Written Opinion from International Application No. PCT/US2008/083519, dated Jan. 9, 2009.

Waterloo Medication Cart Series—Dual Sided Medication Cart brochure dated prior to May 25, 1999.

HON catalog, 310 Series Deep Full Suspension Files, p. 147, published prior to May 25, 1999.

Lista catalog, p. 10, dated prior to May 25, 1999.

Snap-on catalog, depicting Roll Cab and top Chest, pp. 26-27, date prior to May 25, 1999.

Bott Model R1 catalog and mobile cabinet dated prior to May 25, 1999.

International Search Report and Written Opinion from International Application No. PCT/US07/87556, dated May 8, 2008.

* cited by examiner

DOOR LATCH

CROSS REFERENCE TO RELATED APPLICATIONS

This application claims the benefit of U.S. Provisional Patent Application Ser. No. 60/988,627, entitled "DOOR LATCH" and filed Nov. 16, 2007, the entire contents of which are incorporated herein by reference, to the extent that they are not conflicting with the present application.

BACKGROUND

Mechanics' cabinets and tool cabinets typically are fabricated from sheet metal and may include a cabinet enclosure with hinged doors. In order to provide security for the contents within the cabinet, a locking system may be provided. The locking system will normally include a key actuated mechanism which enables locking of the doors in a closed position. Actuation or release of the key operated mechanism is necessary in order to release or unlock the doors.

SUMMARY

According to an inventive aspect of the present application, a cabinet door may be configured to remain or be retained in a closed position unless positively opened by the mechanic or user of the cabinet, even when the cabinet door is unlocked. This may be a desirable feature in a cabinet construction in order to preclude accidental opening of doors. Maintaining the doors in a closed position also inhibits the doors from opening when the cabinet is, for example, being transported from one position or location to another. In one such embodiment, a door latch for retaining a cabinet door in a closed position is operable to a door release condition by a door release handle.

Accordingly, in an exemplary embodiment of the present application, a cabinet includes a frame portion and a door hingedly connected to the frame portion for pivoting movement about a hinge axis between an open position and a closed position. A member is rigidly connected to the door and includes a flange portion extending from and spaced apart from a first outer surface of the door. A handle is pivotably connected to the door and includes a user graspable portion disposed between the first outer surface of the door and the flange portion of the member. A catch member is rigidly connected to the user graspable portion and extends through a slot in the door for interlocking engagement with a retaining feature disposed on the frame portion. When the door is in the closed position, the handle is pivotable with respect to the door from a door retention position to a door release position for disengagement of the catch member from the door retaining feature.

DETAILED DESCRIPTION

This Detailed Description merely describes embodiments of the present application and is not intended to limit the scope of the claims in any way. Indeed, the inventions as described in the specification and claims are broader than and unlimited by the preferred embodiments, and the terms used in the claims have their full ordinary meaning.

The present application contemplates a door latch for retaining a door in a closed condition. While the exemplary embodiments described herein refer to uses of door latches in cabinet assemblies (such as, for example, wall or floor cabinets), the disclosed door latches can be used in a wide variety of different applications, including, for example, use with desks, lockers, or other such arrangements. One embodiment of a cabinet includes a cabinet frame, one or more cabinet doors, a door release handle, and a catch member. The door is hingedly connected to the cabinet frame at a first end of the door. The door release handle is movably connected to the door at a second end of the door opposite the first end. The door release handle has a pivot wall that has an edge that is pivotable with respect to the door to allow the door release handle to move between a door retention position and a door release position. When the handle is in the door retention position and the door is in a closed position, the catch member is coupled to the cabinet frame to maintain the door in the closed position. When the handle is in the door release position and the door is in the closed position, the catch member is decoupled from the cabinet frame to allow the door to move from the closed position to an open position. Other embodiments of the invention can have various door, release, and latch combinations.

The present application discloses different embodiments of door latches. The disclosed door latches include a variety of different features. The individual features of the following embodiments may be used alone or in combination with features of other embodiments. The disclosed door latches can be used in a wide variety of different applications, including pivoting door assemblies.

Figure 1A:
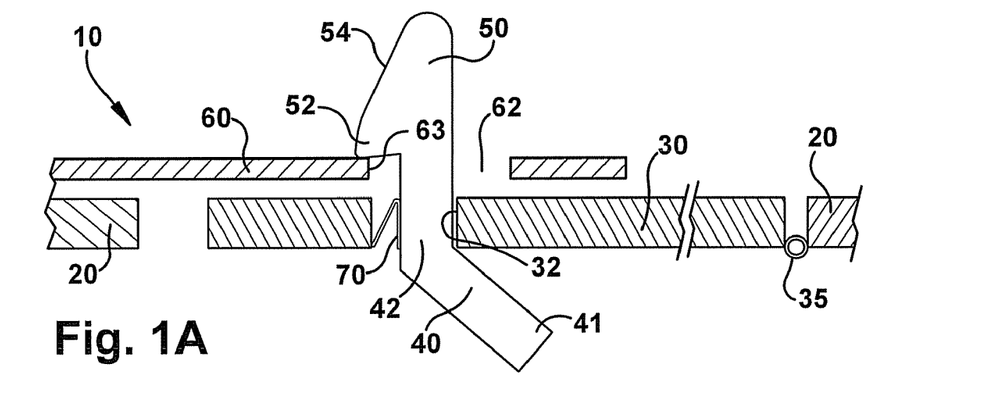
FIG. 1A is a schematic partial cross-sectional view of a cabinet assembly, with a door in a closed and latched position.
Figure 1B:
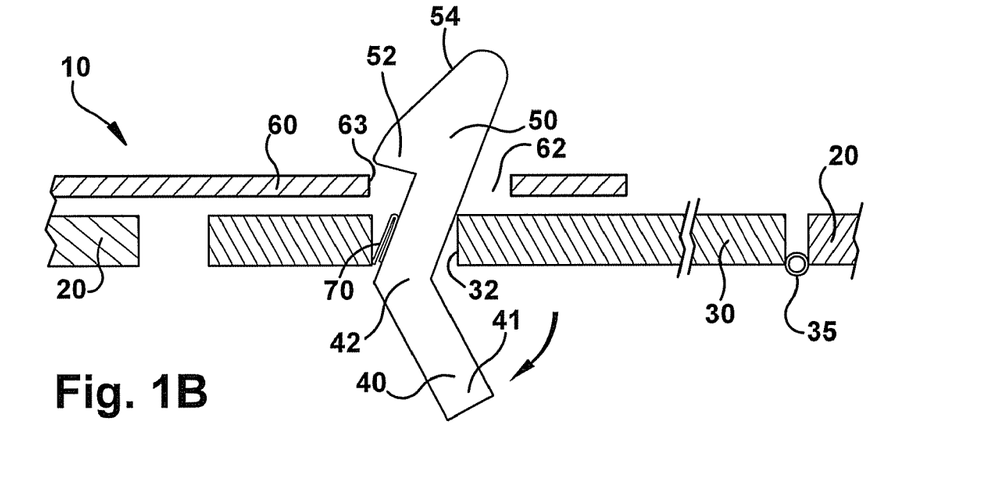
FIG. 1B is a schematic partial cross-sectional view of the cabinet assembly of FIG. 1A, with the door in a closed unlatched position.
Figure 1C:
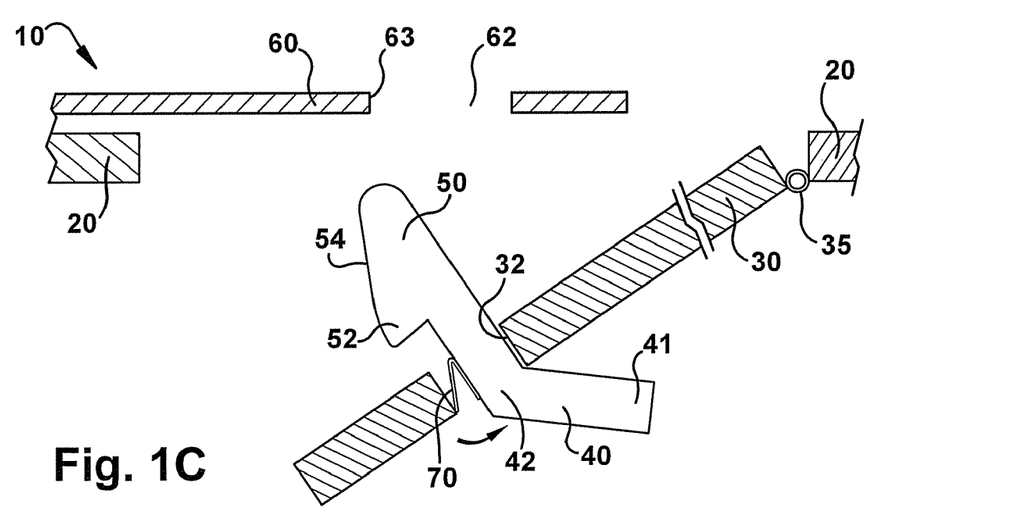
FIG. 1C is a schematic partial cross-sectional view of the cabinet assembly of FIG. 1A with the door in an open position.

FIGS. 1A, 1B, and 1C schematically illustrate an embodiment of a cabinet assembly 10. The cabinet assembly includes a cabinet frame 20, a door 30, a release handle 40, and a catch member 50. The cabinet frame 20 can take a wide variety of different forms. Any cabinet frame configuration that accepts a pivoting door can be used.

The door 30 is shown pivotably connected to the cabinet frame 20 at a hinged portion 35; however, the door 30 can be pivotably connected to the cabinet frame 20 in a wide variety of different ways. In the embodiment illustrated by FIGS. 1A, 1B, and 1C, the release handle 40 includes a user graspable portion 41 disposed beyond an outer surface of the door 30. A pivotable portion 42 of the release handle 40 extends from (and may, but need not, be integral with) the user graspable portion 41 through a slot or other such aperture 32 in the door 30, the pivotable portion 42 being pivotable within the aperture 32 to allow the release handle 40 to move between a door retention position (FIG. 1A) and a door release position (FIG. 1B). The user graspable portion 41 may have any configuration that allows the user to move the release handle 40 from the door retention position to the door release position. The user graspable portion 41 may also be configured to facilitate pulling of the door towards a pivoted open position.

The pivotable portion 42 of the release handle 40 is connected with (and may, but need not, be integral with) the catch member 50. When the handle 40 is in the door retention position (FIG. 1A) and the door 30 is in a closed position, the catch member 50 is coupled to the cabinet frame 20 to maintain the door 30 in the closed position. When the handle 40 is in the door release position (FIG. 1B) and the door 30 is in the closed position, the catch member 50 is decoupled from the cabinet frame 20 to allow the door 30 to move from the closed position to an open position. The catch member 50 can take a wide variety of different forms and can be coupled to and decoupled from the cabinet frame 20 in a wide variety of different ways. The catch member 50 and cabinet frame 20 can be configured in any manner where the catch member 50 is coupled to the frame 20 when the catch member 50 is in a first position and the catch member 50 is decoupled from the frame 20 when the catch member 50 is in a second position. In the example illustrated by FIGS. 1A, 1B, and 1C, the catch member 50 includes a latching portion 52. A structure 60 is supported by the cabinet frame 20 that includes a retaining feature, such as, for example, an opening or recess 62 that aligns with the door aperture 32 when the door 30 is in the closed position. When the handle 40 is in the door retention position (FIG. 1A), the latching portion 52 extends into the opening or recess 62 and engages or overlaps an edge 63 of the recess 62 to couple the door 40 to the cabinet frame 20. When the handle 40 is in the door release position (FIG. 1B), the latching portion 52 disengages the edge 63 of the recess 62 to allow the catch member 50 to be withdrawn from the recess 60 to decouple the door 30 from the cabinet frame 20. The structure 60 may comprise any of a variety of components, including, for example, a frame member, a bracket, or a shelf within a cabinet.

To retain the release handle 40 in the door retention position, a spring or other such biasing member may be provided to urge or bias the release handle into the door retention position. For example, a spring member 70 may be disposed between the handle 40 and the door 30 to bias the handle 40 toward the door retention position. Any suitable spring or biasing member may be utilized, including, for example, leaf springs, compression springs, and torsion springs. Further, in the example illustrated by FIGS. 1A, 1B, and 1C, the catch member 50 includes a tapered surface 54 that allows the door 30 to be moved from an open position to a closed position without manually moving the handle 40 to the door release position. When the door 30 is pivoted to the closed position, the tapered surface 54 engages the edge 63 of the recess 62. Further closing force against the door 30 causes the catch member 50 to pivot against the spring member 70 and slide against the edge 63, until the latching portion 52 extends past the edge 63, allowing the handle 40 and catch member 50 to pivot back to the door retention position.

Figure 2A:
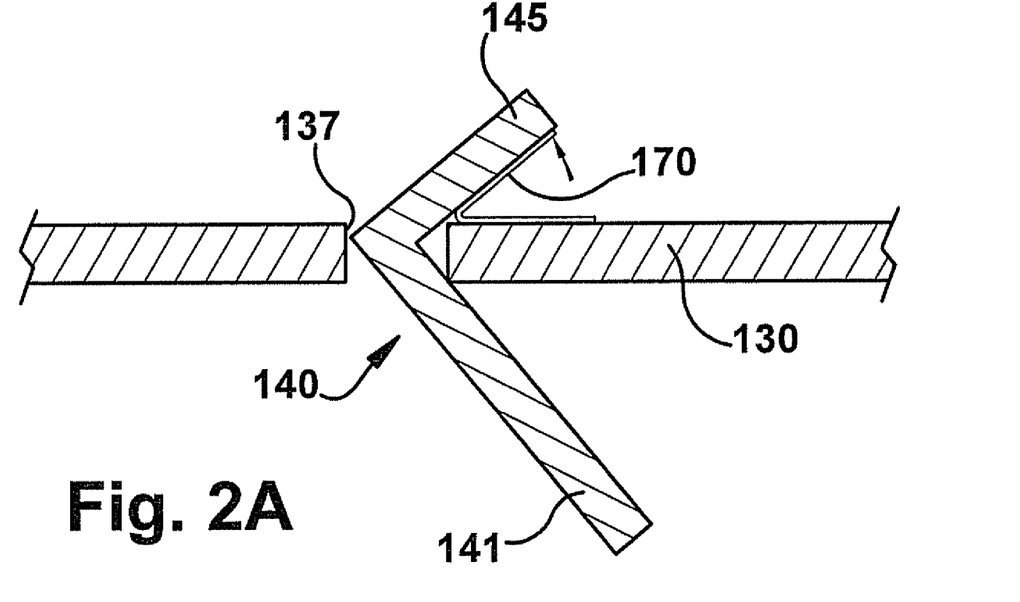
FIG. 2A is a schematic partial cross-sectional view of a door and handle assembly, with the handle in a door retention position.
Figure 2B:
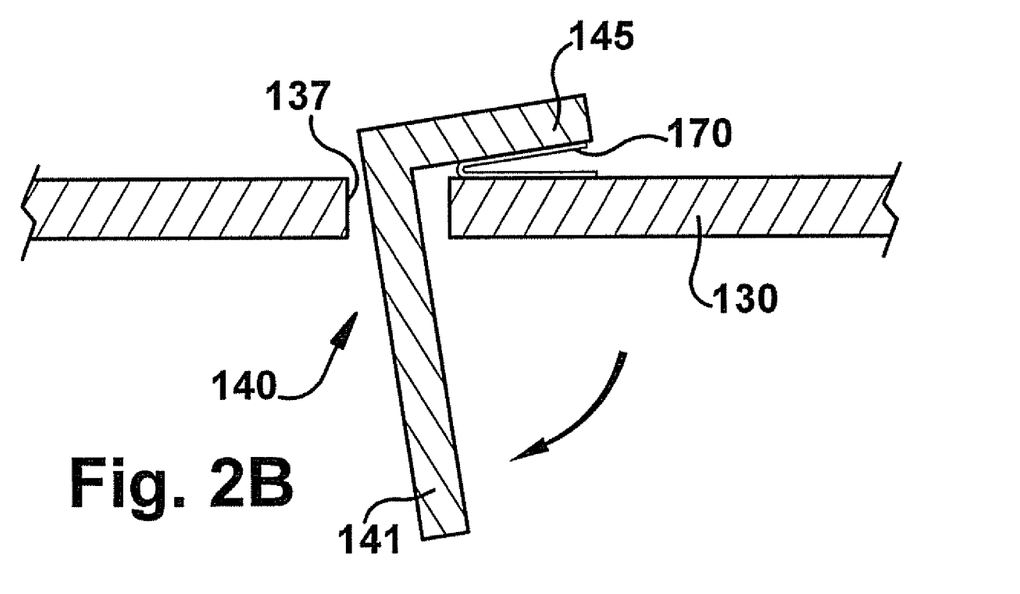
FIG. 2B is a schematic partial cross-sectional view of the door and handle assembly of FIG. 2A, with the handle in a door release position.

In an exemplary embodiment, the release handle is coupled to an end portion of the door 30 opposite the hinged portion 35. The release handle 40 may be coupled to any location on the door 30 in a wide variety of different ways. The release handle 40 can be coupled to the door 30 in any manner that allows the release handle 40 to pivot with respect to the door 30. FIGS. 2A and 2B illustrate a cross-sectional schematic view of a door and handle connection of one embodiment of a cabinet door 130 where a release handle 140 is movably coupled to the door 130 by one or more tabs 145 extending from the handle through corresponding openings 137 in the door 130. As shown, the tabs 145 may be partially bent or crimped after insertion through the openings 137 to retain the release handle 140 on the door 130 while allowing the handle 140 to pivot with respect to the door 130. As with the embodiment of FIGS. 1A, 1B, and 1C, a spring member 170 may be included to urge the handle 140 toward the door retention position (FIG. 2A), while allowing a user to pivot the handle 140 against the biasing force of the spring member 170 and into the door release position.

Figure 3:
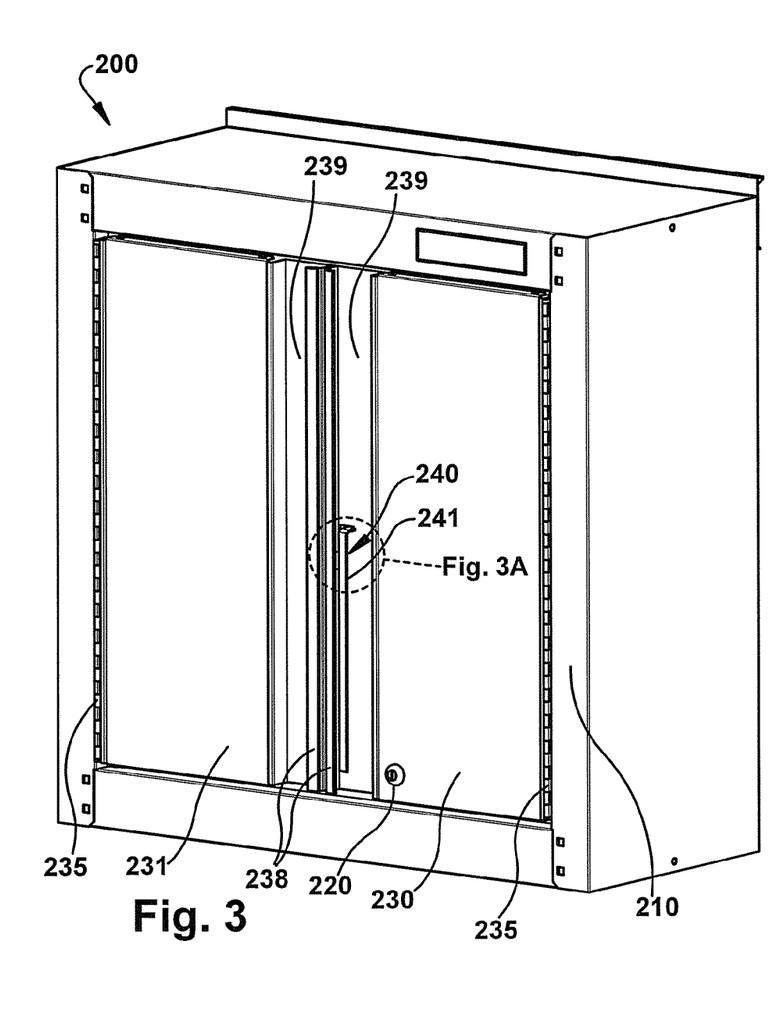
FIG. 3 is a perspective view of a cabinet assembly.
Figure 4:
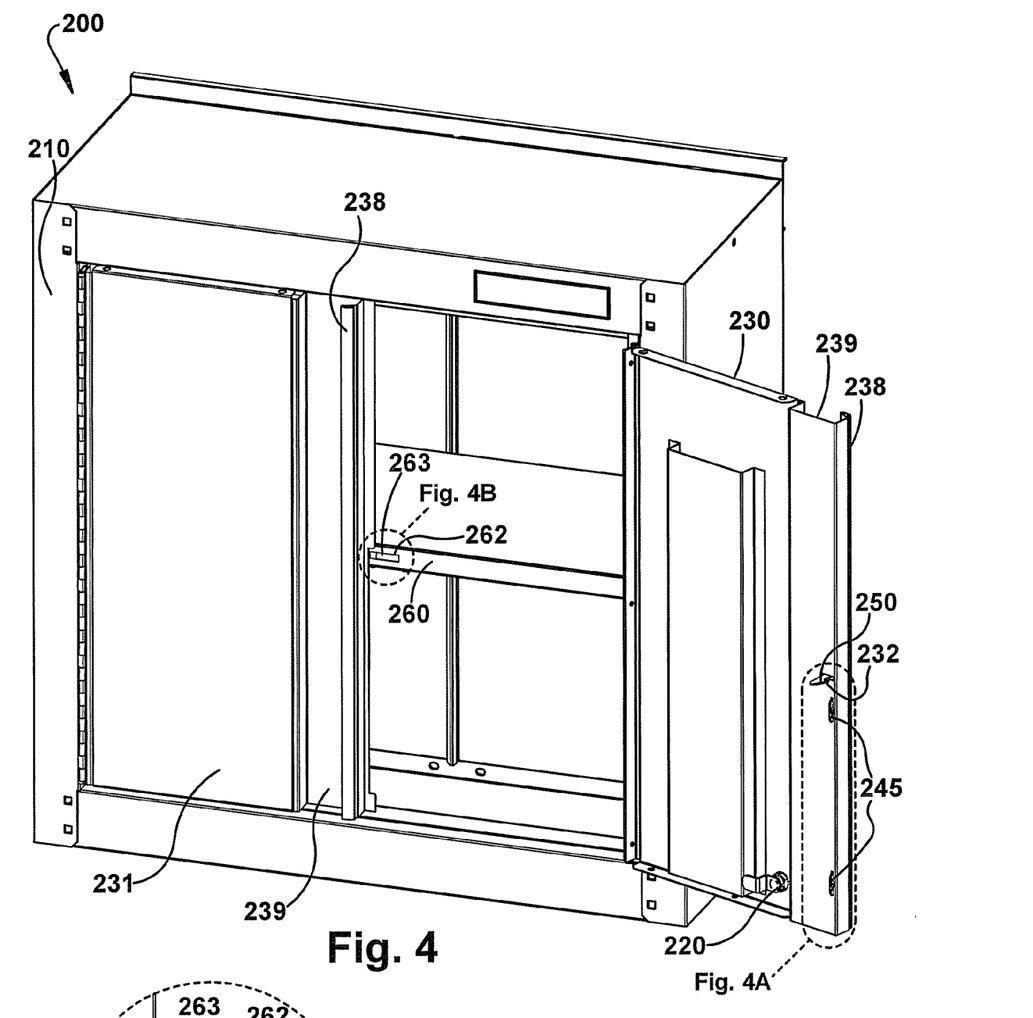
FIG. 4 is a perspective view of the cabinet assembly of FIG. 3, with a door in an open position.

Any combination of the concepts described above may be used in a wide variety of door and enclosure assemblies. FIGS. 3 and 4 illustrate one example of a wall cabinet assembly that includes concepts described above. A wide variety of other enclosures may be made using the concepts described above.

Referring to FIGS. 3 and 4, the cabinet assembly 200 includes a cabinet enclosure or frame 210 and a pair of doors 230, 231 connected with the cabinet frame at hinges 235, to allow the doors 230, 231 to pivot between open and closed positions. The exemplary cabinet 200 includes internal shelves 260 for storing items. While the illustrated embodiment includes a conventional key cylinder locking mechanism 220, other locking mechanisms may additionally or alternatively be utilized, including, for example, mechanical combination locks and electronic locking mechanisms (e.g., biometric locks, digital keypad locks, or remotely actuated locking mechanisms). In still other embodiments, a cabinet may be provided without a locking arrangement.

A release handle 240 is movably coupled to at least one of the doors 230, 231. While the release handle 240 may be coupled to any location on the door 230, in the illustrated embodiment, the handle 240 is coupled to an end of the door 230 opposite the hinge 235. Further, the handle 240 may be fully or partially disposed behind a trim member 238 affixed to the edge of the door 230. This arrangement may serve to conceal the handle 240 (for example, for aesthetic purposes) and may also facilitate opening of the door 230, as a user may simultaneously grasp both the trim member 238 and the handle 240 to pivot the handle 240 to a door release position and pull the door toward the open position. Further, the door 230 may be provided with a recessed area 239 proximate to the handle 240 and trim member 238 to facilitate user grasping while reducing the amount that the handle 240 and trim 238 jut out from the cabinet 200 (for example, to conserve space and reduce the risk of inadvertent bumping).

Figure 3A:
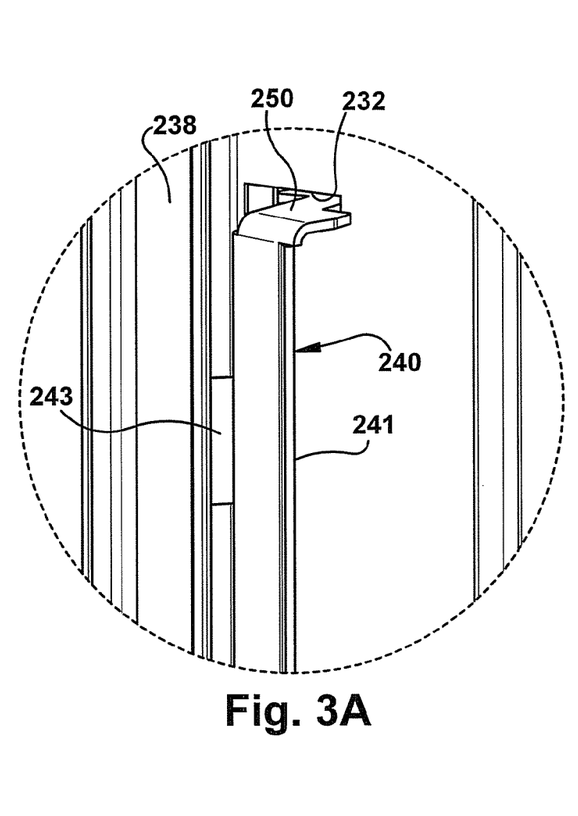
FIG. 3A is an enlarged perspective view of a portion of the cabinet assembly of FIG. 3.
Figure 5A:
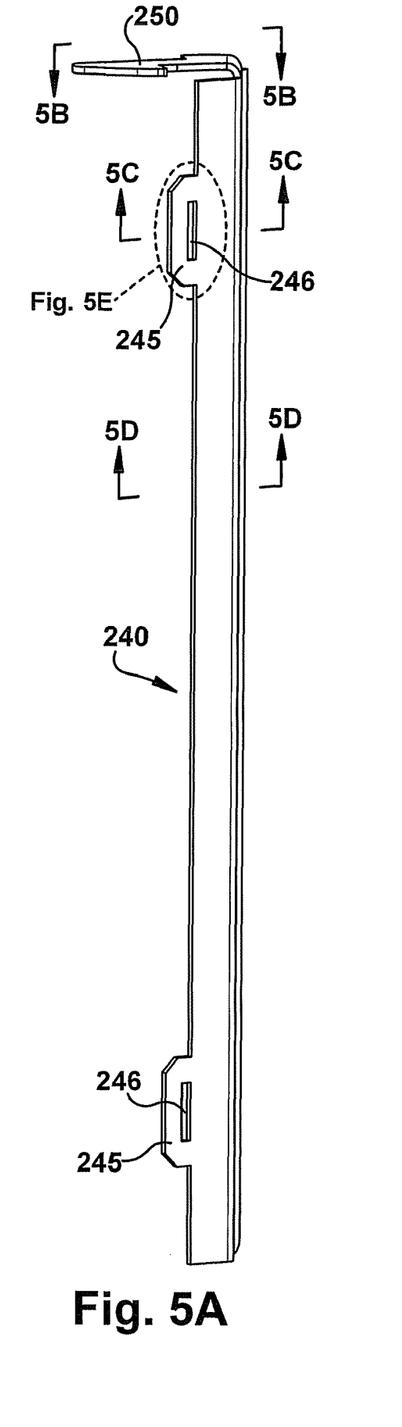
FIG. 5A is a side perspective view of a door release handle.
Figure 5B:
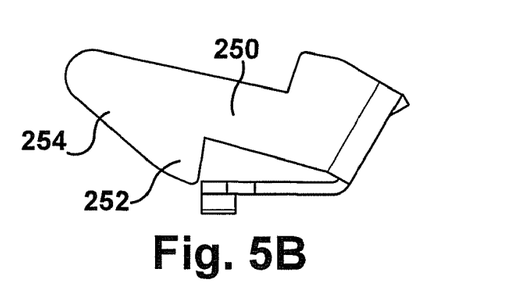
FIG. 5B is an end view of the door release handle of FIG. 5A.
Figure 5C:
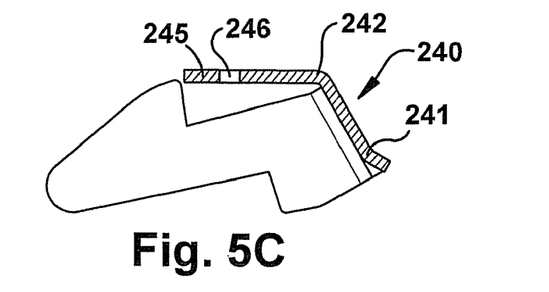
FIG. 5C is a cross-sectional view of the door release handle of FIG. 5A.
Figure 5D:
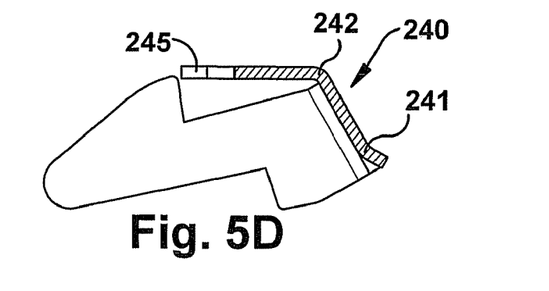
FIG. 5D is another cross-sectional view of the door release handle of FIG. 5A.
Figure 5E:
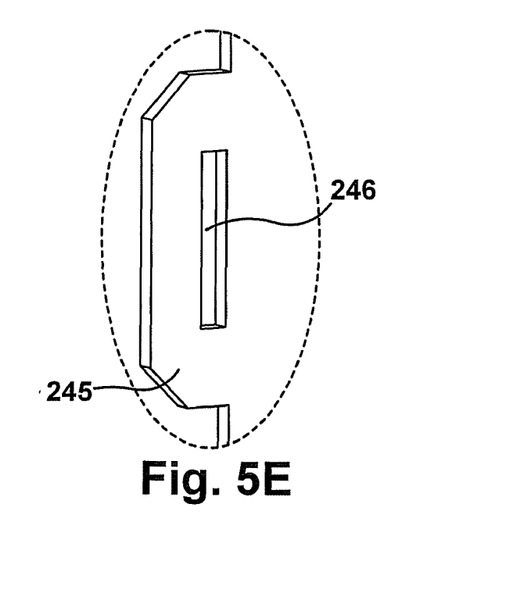
FIG. 5E is an enlarged view of a tab portion of the door release handle of FIG. 5A.

The release handle 240 includes a user graspable portion 241 (FIGS. 3 and 3A) disposed beyond an outer surface of the door 230. A pivotable portion 242 of the release handle 240 (see FIGS. 5B and 5D) extends from (and may, but need not, be integral with) the user graspable portion 241 through a slot or other such aperture 237 in the door 230, the pivotable portion 242 being pivotable within the aperture 237 to allow the release handle 240 to move between a door retention position and a door release position. The user graspable portion 241 may have any configuration that allows the user to move the release handle 240 from the door retention position to the door release position. The user graspable portion 241 may also be configured to facilitate pulling of the door towards a pivoted open position.

Figure 4A:
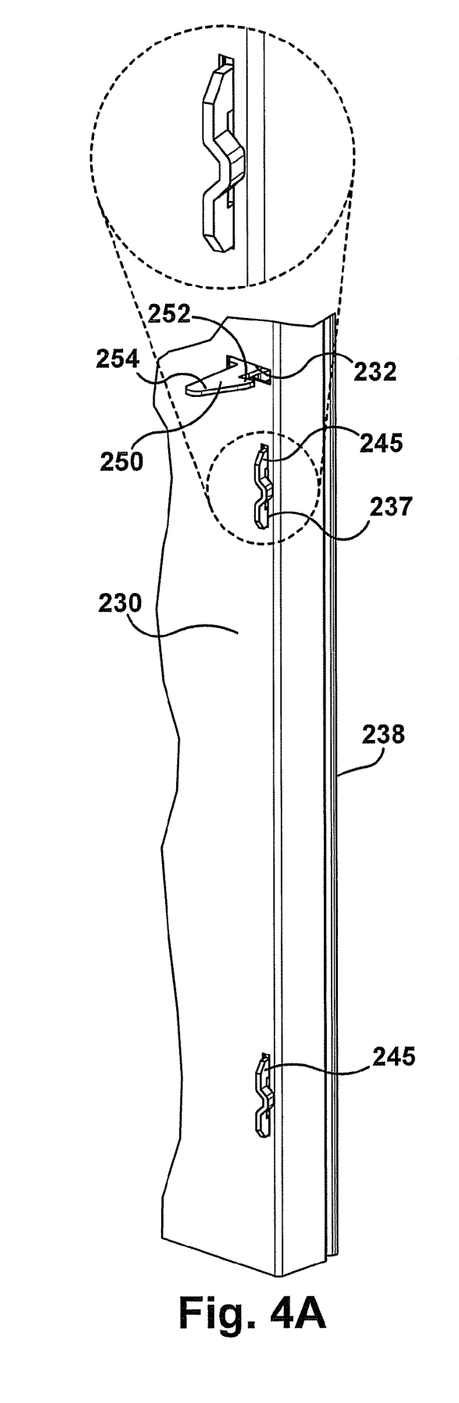
FIG. 4A is an enlarged perspective view of a portion of the door of FIG. 4.

The pivotable portion 242 of the release handle 240 is connected with (and may, but need not, be integral with) a catch member 250 that extends through a door aperture 232 (see FIG. 4A). When the door 230 is in the closed position and the handle 240 is in the door retention position, the catch member 250 extends through a retaining feature (e.g., a slot or opening 262) in the shelf 260 (see FIG. 4), with a latching portion 252 engaging or overlapping an edge 263 of the opening 262 to secure the door 230 in the closed position. To provide more precise alignment of the catch member 250 with the retaining feature during latching and unlatching of the closed door 230, an adjustable latch plate 264 may be assembled with the shelf 260 to adjust the position of the opening 262 and the edge 263. The latch plate 264 may be selectively adjustable, for example, by one or more fasteners 266 adjustably positionable along slots in the shelf.

As shown in FIG. 4A, the release handle 240 of the exemplary cabinet 200 is movably coupled to the door 230 by a pair of tabs 245 extending from the handle 240 through corresponding openings 237 in the door 230. The tabs 245 may be partially bent or crimped after insertion through the openings 237 to retain the release handle 240 on the door 230 while allowing the handle 240 to pivot with respect to the door 230. The tabs 245 may be crimped at an angle configured to limit pivoting of the handle 240 between desired door retention and door release positions.

Figure 4B:
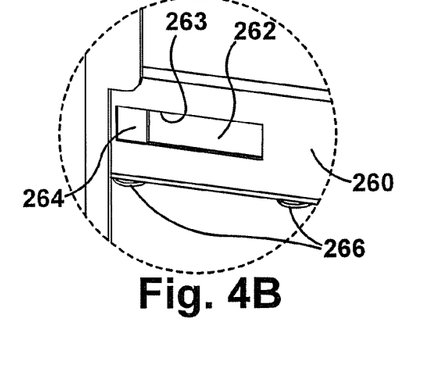
FIG. 4B is an enlarged perspective view of a portion of the cabinet of FIG. 4.
Figure 4C:
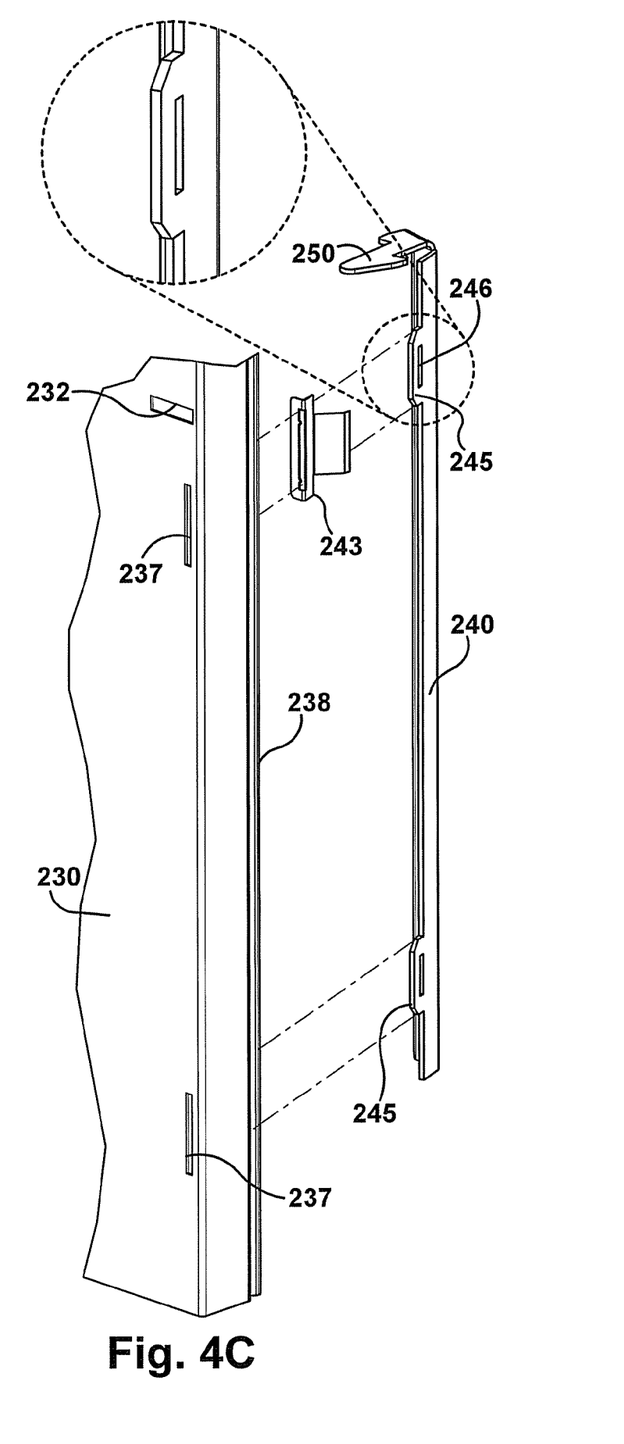
FIG. 4C is an exploded perspective view of the door portion of FIG. 4A

One or more spring members may be provided to urge or bias the handle 240 into the door retention position. While many different types of spring members may be utilized, in the illustrated embodiment (see FIG. 4C), a spring plate 243 may be assembled with one or more of the tabs 245, such that the spring plate 243 is captured between the release handle 240 (FIG. 4B) and the door 230. The spring plate 243 is bent or otherwise contoured to be resiliently biased against the trim member 238 of the door 230, thereby biasing the door release handle 240 toward the door retention position.

When a user pivots the handle 240 from the door retention position to the door release position, the latching portion 252 moves out of engagement with the edge 263 of the opening 262 to allow the catch member 250 to be withdrawn from the opening 262 such that the door 230 may be pivoted to the open position. As shown, the catch member 250 may also be provided with a tapered surface 254 that allows the door 230 to be moved from an open position to a closed position without manually moving the handle 240 to the door release position. When the door 230 is pivoted to the closed position, the tapered surface 254 engages the edge 263 of the recess 262. Further closing force against the door 230 causes the catch member 250 to pivot against the spring plate 243 and slide against the edge 263, until the latching portion 252 extends past the edge 263, allowing the handle 240 and catch member 250 to be pivoted back to the door retention position by the spring plate 243.

FIGS. 5 and 5A-5D illustrate an exemplary release handle 240 with integral catch member 250. As shown, the tab portions 245 may be provided with slots 246 to facilitate bending or crimping of the tabs 245 to securely retain the release handle 240 on the door 230, while permitting the desired range of pivoting movement of the handle 240.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A cabinet comprising:
a cabinet enclosure including a frame portion;
a door having first and second opposed ends, the first end of the door being hingedly connected to the frame portion for pivoting movement about a hinge axis between an open position and a closed position;
a member rigidly connected to a first outer surface of the door, the member including a flange portion extending from and spaced apart from the first outer surface of the door; and
a handle pivotably connected to the door, the handle including a user graspable portion disposed between the first outer surface of the door and the flange portion of the member, and a catch member rigidly connected to the user graspable portion and extending through a slot in the door for interlocking engagement with a retention feature disposed on the frame portion;
wherein when the door is in the closed position, the handle is pivotable with respect to the door from a door retention position to a door release position for disengagement of the catch member from the door retention feature; and
further wherein the frame portion further comprises a shelf member, further wherein the retention feature comprises a slot disposed in an outer surface of the shelf member.

2. The cabinet of claim 1, wherein the member and the handle are connected to the second end of the door.

3. The cabinet of claim 1, wherein the handle is pivotable about an axis parallel to the hinge axis.

4. The cabinet of claim 1, further comprising a spring member positioned between the handle and at least one of the door and the member to bias the handle toward the door retention position.

5. The cabinet of claim 1, wherein the handle is pivotably connected to the door by at least one tab extending from the handle through a corresponding slot in the door, the at least one tab being disposed at an angle configured to limit pivoting of the handle between the door retention position and the door release position.

6. The cabinet of claim 5, further comprising a spring plate assembled to the at least one tab to bias the handle toward the door retention position.

7. The cabinet of claim 1, wherein the retention feature comprises a slot extending in a direction perpendicular to a pivot axis of the handle.

8. The cabinet of claim 1, wherein the first outer surface of the door is recessed from a second outer surface of the door, and the flange portion of the member is substantially flush with the second outer surface of the door.

9. The cabinet of claim 1, wherein the user graspable portion of the handle comprises an elongated bar, with the catch member extending from a first end of the elongated bar.

10. The cabinet of claim 1, wherein the retention feature comprises an adjustable plate positionable on a rigid frame member of the enclosure to adjustably align the retention feature with the catch member.

11. A cabinet comprising:
a cabinet enclosure including a frame portion;
a door having first and second opposed ends, the first end of the door being hingedly connected to the frame portion for pivoting movement about a hinge axis between an open position and a closed position; and
a handle pivotably connected to the door and pivotable about an axis parallel to the hinge axis, the handle including a user graspable portion and a catch member rigidly connected to the user graspable portion and extending through a slot in the door for interlocking engagement with a slot disposed in an outer surface of a shelf member within the cabinet;
wherein when the door is in the closed position, the handle is pivotable with respect to the door from a door retention position to a door release position for disengagement of the catch member from the slot.

12. The cabinet of claim 11, further comprising a spring member positioned between the handle and the door to bias the handle toward the door retention position.

13. The cabinet of claim 11, wherein the door comprises a door trim portion extending from and spaced apart from a first outer surface of the door, wherein the user graspable portion of the door is disposed between the first outer surface of the door and the door trim portion.

14. A cabinet comprising:
a cabinet enclosure including a frame portion;
a door having first and second opposed ends, the first end of the door being hingedly connected to the frame portion for pivoting movement about a hinge axis between an open position and a closed position;
a handle pivotably connected to the door, the handle including a user graspable portion and a catch member rigidly connected to the user graspable portion and extending through a slot in the door for interlocking engagement with a slot disposed in an outer surface of a shelf member within the cabinet; and
a spring member positioned between the handle and the door to bias the handle toward the door retention position;
wherein when the door is in the closed position, the handle is pivotable with respect to the door from a door retention position to a door release position for disengagement of the catch member from the slot.

15. The cabinet of claim 14, wherein the handle is pivotable about an axis parallel to the hinge axis.

16. The cabinet of claim 14, wherein the door comprises a door trim portion extending from and spaced apart from a first outer surface of the door, wherein the user graspable portion of the door is disposed between the first outer surface of the door and the door trim portion.

* * * * *